(12) United States Patent
Malen et al.

(10) Patent No.: US 8,857,390 B2
(45) Date of Patent: Oct. 14, 2014

(54) ADHESIVE JOINING FOR POWDER METAL COMPONENTS

(75) Inventors: Gerald Michael Malen, Troy, MI (US); Timothy Costanzo, Emporium, PA (US); Ian W. Donaldson, Jefferson, MA (US); Joel H. Mandel, Hartford, WI (US)

(73) Assignee: GKN Sinter Metals, LLC, Auburn Hill, MI (US)

( * ) Notice: Subject to any disclaimer, the term of this patent is extended or adjusted under 35 U.S.C. 154(b) by 85 days.

(21) Appl. No.: 13/318,437

(22) PCT Filed: Jun. 5, 2009
(Under 37 CFR 1.47)

(86) PCT No.: PCT/US2009/046423
§ 371 (c)(1),
(2), (4) Date: Jan. 30, 2012

(87) PCT Pub. No.: WO2010/128976
PCT Pub. Date: Nov. 11, 2010

(65) Prior Publication Data
US 2012/0132160 A1    May 31, 2012

Related U.S. Application Data

(60) Provisional application No. 61/175,154, filed on May 4, 2009.

(51) Int. Cl.
| | | |
|---|---|---|
| F01L 1/34 | (2006.01) | |
| B22F 5/00 | (2006.01) | |
| B22F 7/06 | (2006.01) | |
| F01L 1/344 | (2006.01) | |
| F16B 11/00 | (2006.01) | |
| B22F 5/10 | (2006.01) | |
| B22F 5/08 | (2006.01) | |

(52) U.S. Cl.
CPC ............ B22F 7/062 (2013.01); B22F 5/008 (2013.01); F16B 11/008 (2013.01); B22F 5/106 (2013.01); F01L 2103/00 (2013.01); F01L 1/3442 (2013.01); B22F 5/08 (2013.01)
USPC ............. 123/90.17; 123/90.15; 123/90.16; 419/28

(58) Field of Classification Search
CPC ....... F01I 1/3442; F01I 1/34; F02D 2041/001
USPC ................... 123/90.15–90.17; 419/6, 28
See application file for complete search history.

(56) References Cited

U.S. PATENT DOCUMENTS

| | | | |
|---|---|---|---|
| 2,957,235 A | 10/1960 | Steinberg | |
| 5,669,825 A * | 9/1997 | Shira | ............................. 473/324 |

(Continued)

FOREIGN PATENT DOCUMENTS

| | | |
|---|---|---|
| CN | 1727677 A | 2/2006 |
| CN | 101182836 A | 5/2008 |
| EP | 1 923 155 A | 5/2008 |
| JP | 2003239974 A | 8/2003 |
| JP | 2005214320 A | 8/2005 |
| JP | 2008121095 A | 5/2008 |

OTHER PUBLICATIONS

International Search Report and Written Opinion under date of mailing of Jan. 19, 2010 in connection with PCT/US2009/046423.
State Intellectual Property Office of People's Republic of China, First Office Action, Application No. 200980159087, Mar. 5, 2013.
State Intellectual Property Office of People's Republic of China, Second Office Action, Application No. 200980159087, Oct. 18, 2013.
Japan Patent Office, Notification of Rejection Reasons, Application No. 2012-508453, Oct. 1, 2013.

*Primary Examiner* — Kenneth Bomberg
*Assistant Examiner* — Wesley Harris
(74) *Attorney, Agent, or Firm* — Quarles & Brady LLP (57) ABSTRACT

A method of joining multiple powder metal components to form a powder metal component assembly using an adhesive is disclosed. By machining at least one of the powder metal components prior to the adhesive joining, otherwise difficult to machine features can be more easily machined for less cost and at higher production rates. Unlike high temperature joining techniques, the adhesive joins the powder metal components at room temperature. This room temperature adhesive joining eliminates the thermal distortions in pre-joined machined features common to high temperature joining techniques such as brazing or welding that bring these features out of specification during joining.

19 Claims, 4 Drawing Sheets

(56) References Cited

U.S. PATENT DOCUMENTS

| | | | |
|---|---|---|---|
| 7,222,598 B2 * | 5/2007 | Hayashi | 123/90.17 |
| 7,246,580 B2 * | 7/2007 | Palesch et al. | 123/90.17 |
| 7,849,829 B2 * | 12/2010 | Clever et al. | 123/90.6 |
| 2004/0005237 A1 * | 1/2004 | Liu | 419/28 |
| 2006/0024181 A1 | 2/2006 | Kim | |
| 2008/0011266 A1 * | 1/2008 | Staudenmaier et al. | 123/198 R |
| 2008/0110334 A1 | 5/2008 | Mogami | |

* cited by examiner

FIG. 6  FIG. 7

ADHESIVE JOINING FOR POWDER METAL COMPONENTS

CROSS-REFERENCE TO RELATED APPLICATIONS

This represents the national stage entry of PCT International Application No. PCT/US2009/046423 filed Jun. 5, 2009 which claims the benefit of U.S. Provisional Application 61/175,154 filed May 4, 2009 which is hereby incorporated by reference for all purposes.

STATEMENT CONCERNING FEDERALLY SPONSORED RESEARCH OR DEVELOPMENT

Not applicable.

FIELD OF THE INVENTION

This invention relates to the joining of powder metal components. In particular, this invention relates to the joining of power metal components, such as rotors and adaptors, using adhesive.

BACKGROUND OF THE INVENTION

Powder metallurgy provides a cost effective way of producing components having relatively complex shapes at an acceptable cost. By compacting a powder metal into a preform and then sintering the preform into a sintered part, a porous body can be formed that is dimensionally close to the final desired component. Secondary operations, such as machining, grinding and the like can be used, and in some cases may be necessary, to bring the sintered part within dimensional specifications. The near net shape fabrication techniques used in powder metallurgy reduce the amount of time needed to complete these secondary operations and also minimize the scrap produced as the sintered parts are dimensionally very close to the final desired size of the part. However, some complex parts have dimensional requirements that make their fabrication difficult, even using powder metallurgy.

For example, a variable valve timing (VVT) rotor has many features and dimensional requirements that make fabrication difficult. The VVT rotor has a flat surface that must be extremely smooth (total tolerance of 15 microns) and that has an adjacent surface that is perpendicular to and that extends outwardly from this flat surface. During part fabrication, this flat surface can not be easily ground because of the adjacent surface. Bringing this flat surface into an acceptable range might be done in a number of ways.

Elaborate machining techniques could be used to finish this flat surface. However, these techniques are very expensive, require skilled labor, and take time to perform. Moreover, the initial compaction of a part having this kind of complex shape may require the use of high technology presses that are costly and difficult to operate and maintain.

Alternatively, a VVT rotor could be fabricated as two separate components, the flat surface ground within the specification, and then the two components could be brazed or welded together. However, even this process requires additional finishing once the parts are brazed or welded together, because thermally joining the components together induces stresses and creates distortions in the components that bring the flat surface out of the acceptable range.

Hence, there is a need for an improved method for making powder metal components having difficult to achieve dimensional requirements and a need for the powder metal components themselves.

SUMMARY OF THE INVENTION

The present invention uses adhesive to join multiple powder metal components together. By fabricating the powder metal components separately and then adhesively joining them together to form an assembly, there is an opportunity before joining the components to machine some of the surfaces that would be difficult to machine if the part was formed as a unitary body instead of as an assembly (e.g., grinding a flat surface that has a feature extending therefrom). Furthermore, the powder metal components are joined at or near room temperature and so, unlike brazing or welding, the adhesive joining of the powder metal components does not induce stress or thermal distortions in the powder metal components that brings their pre joined dimensions out of an acceptable range.

Rib structures can be applied at the interface surfaces to assure adhesion and/or sealing at the interface surfaces, and to position the components relative to one another and aid in assembly.

Adhesive joining of powder metal components could be used in any one of a number of types of powder metal assemblies. In one particularly advantageous form, a rotor assembly for a VVT engine is formed using the adhesive joining methods described herein. This rotor assembly has a flat surface formed on the rotor with an adaptor extending therefrom. The flat surface on the rotor can be ground within an acceptable range and then the adaptor can be adhesively joined such that the flat surface does not go outside of the acceptable range during the joining step. Moreover, once the rotor and the adaptor are joined to form the rotor assembly, an inner diameter of both can be turned to produce a finished rotor assembly having acceptable concentricity in the through hole.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
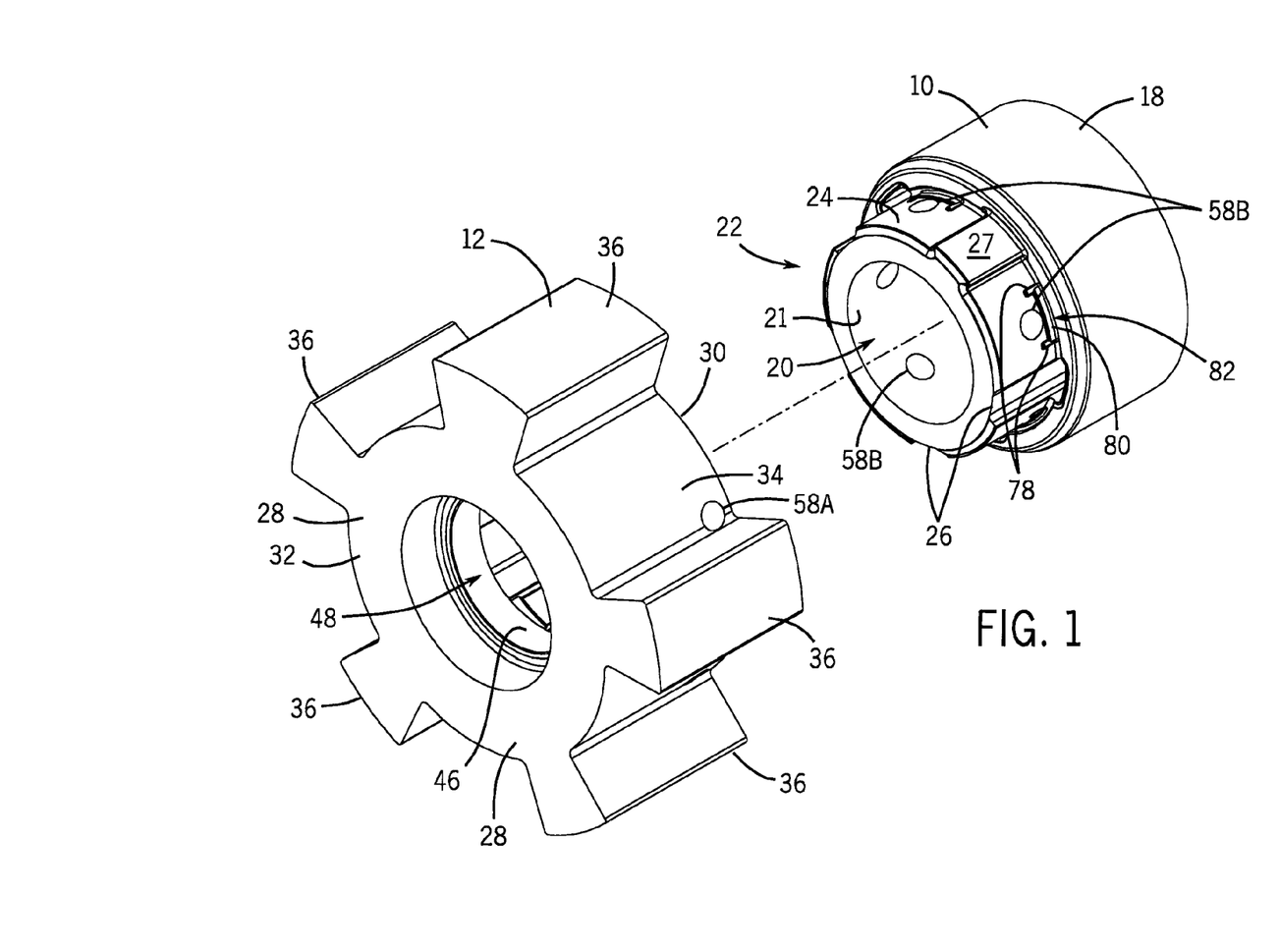
FIG. 1 is a front exploded perspective view of two powder metal components to be assembled according to the invention.
Figure 2:
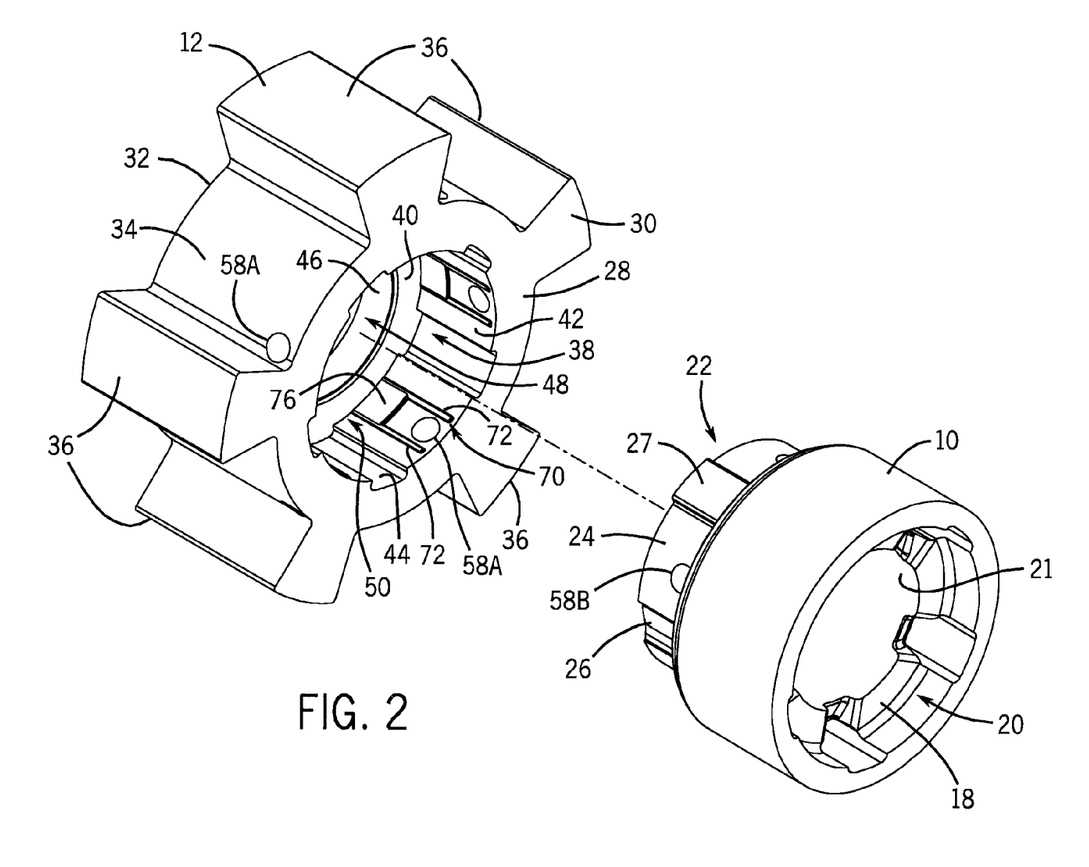
FIG. 2 is a rear exploded perspective view of the components of FIG. 1.

Referring first to FIGS. 1-2, a blank adaptor 10 and a rotor 12 are shown that can be adhesively joined to one another to form a rotor assembly 14 which undergoes finishing operations to form a finished rotor assembly. The adaptor 10 and the rotor 12 are both formed using powder metallurgical processes. Typically, this includes uniaxially compacting a powder metal and binder material in a tool and die set to form a powder metal preform and then sintering the powder metal preform to form a sintered part. Other steps known to those skilled in the art may also be used during this forming process including, but not limited to, burning off some of the binder material prior to sintering to reduce carbon content, forging the sintered part, coining the sintered part, heat treating the sintered part, and the like. The hole 58, made up of holes 58A and 58B would typically not be formed during compaction or sintering, but would typically be drilled either after sintering or after both parts are assembled together, but the holes 58A and 58B are illustrated in FIGS. 1-4 for clarity and ease of description.

Referring now to FIGS. 1-4, the details of the blank adaptor 10 are shown. The blank adaptor 10 has a generally cylindrical body 18 with an axially-extending through hole 20 having a radially inward facing surface 21 or inner diameter. On a mating end 22 that mates with the rotor 12, the blank adaptor 10 has a plurality of radially outward facing interface surfaces 24 and recesses 26 formed therebetween. The recesses 26 are radially offset from the radially outward facing interface surfaces 24.

The details of the rotor 12 are also shown in FIGS. 1-4. The rotor 12 has a generally cylindrical body 28 extending from a first flat surface 30 to a second flat surface 32. The first flat surface 30 and the second flat surface 32 are essentially parallel to one another and are both perpendicular to an axis of rotation A-A. Angularly spaced about a radially outward facing surface 34 of the body 28, a plurality of teeth 36 are formed.

The body 28 also has an axially-extending through hole 38 with a portion for mating with the mating end 22 of the blank adaptor 10 and with a portion for defining a segment of the through hole after the rotor 12 and the blank adaptor 10 are joined and finished. A ledge 40 that extends perpendicular to the axis of rotation A-A separates these two portions. On one side of the ledge 40, the portion of the axially-extending through hole 38 for mating with the mating end 22 of the blank adaptor 10 has a plurality of radially inward facing interface surfaces 42 with a plurality of recesses 44 formed therebetween. The plurality of recesses 44 are radially offset from the plurality of interface surfaces 42.

On the other side of the ledge 40, a radially inward facing surface 46 defines a through hole 48 which, after the rotor 12 and the blank adaptor 10 are adhesively bonded and joined, will be turned to form a portion of the finished through hole 56.

Figure 4:
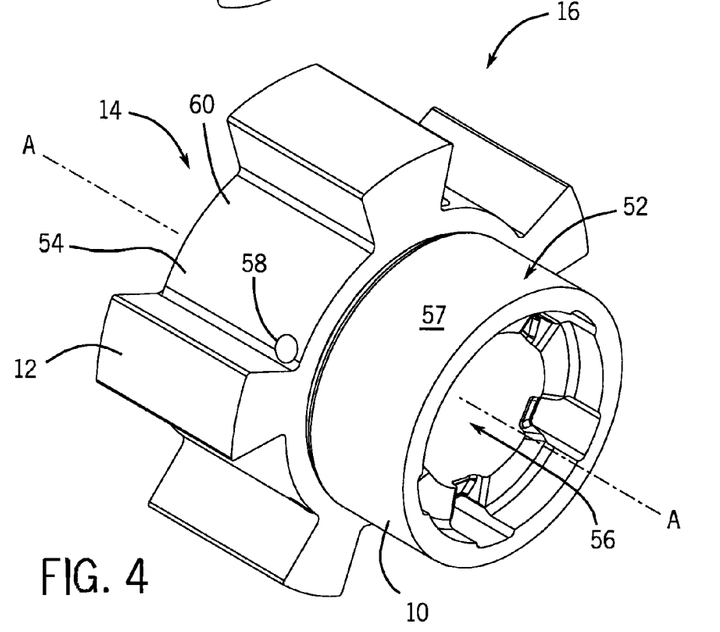
FIG. 4 is a rear perspective view of the assembled components.
Figure 5:
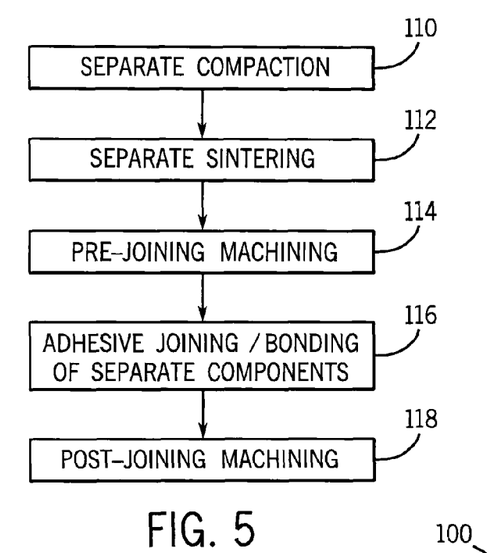
FIG. 5 is a flow chart of the process used to make the finished rotor assembly.

The rotor 12 and the blank adaptor 10 are joined in the manner outlined in FIG. 5 to form the unfinished rotor assembly 14 and then, after step 118, the finished rotor assembly. The finished rotor assembly would look like the unfinished assembly in FIGS. 3 and 4, except the surfaces that are finished after assembly, like the ID of the bore, would be machined. First, the blank adaptor 10 and the rotor 12 are separately compacted in a compaction step 110 and are separately sintered in a sintering step 112 to form the components shown separated in FIGS. 1 and 2, respectively. Next, the first flat surface 30 and the second flat surface 32 of the rotor 12 are ground in a pre joining machining step 114 prior to joining the rotor 12 and the blank adaptor 10. In the form shown, the first flat surface 30 and the second flat surface 32 are finished using fine grinding and brush deburring to obtain a total tolerance of less than 15 microns. However, where other types of powder metal components are being joined, the pre-joining machining step 114 may include other types of machining operations known to those skilled in the art.

Figure 3:
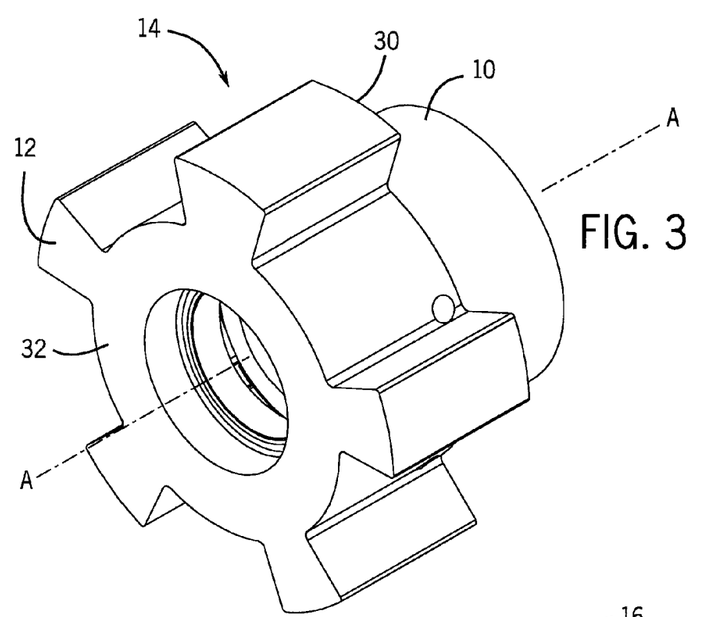
FIG. 3 is a front perspective view of the components assembled.

Next, in a joining step 116, the mating portions of the rotor 12 and the blank adaptor 10 are adhesively joined to one another to form a rotor assembly 14 as seen in FIGS. 3 and 4. First, a bead of an adhesive 50 is applied to the radially inward facing interface surfaces 42 of the rotor 12 as shown in FIG. 2. The mating end 22 of the blank adaptor 10 is then telescopically slid into the mating portion of the axially-extending through hole 38 of the rotor 12 until the blank adaptor 10 abuts or approaches the ledge 40. During this insertion, the adhesive 50 wets the interface surfaces 42 and 24 between the rotor 12 and the blank adaptor 10, respectively, such that the adhesive 50 forms a seal between the rotor 12 and the blank adaptor 10. This seal prevents the leakage of hydraulic fluid at the adhesively joined interface in the finished rotor assembly 16 through the oil feed hole 58 as will be described below in more detail. The adhesive 50 is left to cure at or near room temperature (e.g., typically at or below 120 degrees Fahrenheit), preferably without the addition of external heat in addition to ambient, to join or bond the rotor 12 to the blank adaptor 10.

The adhesive 50 could also be applied in a variety of ways other than by the above-described application of a bead to one of the interface surfaces. The adhesive 50 could also be applied to the radially outward facing surfaces 24 of the blank adaptor 10 in addition to, or instead of, applying the adhesive 50 to the radially inward facing interface surfaces 42 of the rotor 12. Further, the adhesive 50 could be spread over the interface surfaces 24 and 42 in a number of other ways including, but not limited to, brushing it on the interface surfaces, spraying it on the interface surfaces, and the like. It is contemplated that the adhesive 50 may in part seep into the pores of the rotor 12 and the blank adaptor 10 to further strengthen the bond between the two components.

Various types of adhesives may be used. The adhesive 50 is preferably an anaerobic adhesive that does not need to be exposed to oxygen to cure. The adhesive may also be an epoxy that is activated upon the mixing of two or more constituents. However, any adhesive suitable for use with metal could be used to join the components.

Notably, the use of the adhesive 50 that cures at room temperature (without the addition of external heat) as a means of joining the rotor 12 and the blank adaptor 10 does not induce stresses or thermal distortions that would bring the first flat surface 30 or the second flat surface 32 out of an acceptable dimensional range. In contrast, if the rotor 12 and the blank adaptor 10 were joined by brazing, welding, or another high temperature joining process commonly used to join metallic components, then thermal distortions would be highly likely to occur that would bring the flat surfaces 30 and 32 back out of the acceptable range achieved during the pre joining machining.

It is contemplated that interlocking features could be formed in the blank adaptor 10 and the rotor 12 along the interface. In one form, these interlocking features are formed where recesses 26 and 44 are located. These interlocking features supplement, but do not replace, the adhesive joining of the components. When the rotor assembly is subjected to high rotational stresses about the axis of rotation A-A during service, such interlocking features may provide an interference that prevents the adaptor from shearing from the rotor along the adhesive interface.

In one form as illustrated in FIGS. 1 and 2, one or more radially-extending interlocking ridge and groove sets are formed along the interface to interlock the two components.

The adaptor 10 has a ridge 27 that fits closely in one of the recesses 44. Upon telescopically inserting the mating end 22 of the blank adaptor 10 into the axially-extending through hole 38 of the rotor 12, the ridge 27 formed on the blank adaptor 10 slides into a matching recess 44 formed in the rotor to interlock the components against relative rotation. Of course, multiple sets of ridges and grooves could be formed along the interface. Further, a first component could have both ridges and grooves formed thereon that interlock with a second component have mating grooves and ridges.

Although ridges and grooves are described as one example of the interlocking features, it is contemplated that other geometries may be suitable to interlock the components. Any geometry in which a portion of a first component interlocks with a portion of a second component to prevent shearing of the components relative to one another under extreme stress is suitable. It is further contemplated that, in some forms, a key could be placed between a recess formed in the first component and a recess formed in the second component to perform the same function as interlocking features.

It should be appreciated that the blank adaptor 10 can be inserted into the rotor 12 in a number of ways. However, in a preferred form, the dimensions of the mating portions of the blank adaptor 10 and the rotor 12 will be close enough in size that a press fit is required to snuggly force the blank adaptor 10 and the rotor 12 together.

After the rotor 12 and the blank adaptor 10 are adhesively joined to form the unfinished rotor assembly 14, the unfinished rotor assembly 14 can undergo various post-joining machining operations in a post-joining machining step 118 to form the finished rotor assembly 16 (FIG. 4), which is the adhesively joined assembly after the post joining machining operations.

In the form shown, these post-joining machining operations include turning outer diameter of the blank adaptor 10 to form a radially outward facing finished surface 57 and turning the inner diameter of a through hole 56, which is made up of the combination of the through hole 20 of the blank adaptor 10 and the through hole 48 of the rotor 12. By turning these diameters after the blank adaptor 10 and the rotor 12 have been adhesively joined, very tight concentricity requirements are virtually guaranteed in the finished rotor assembly 16.

Further, post-joining, an oil feed hole 58, made up of outer hole 58A in the rotor 12 and inner hole 58B in the adaptor 10, can be machined that extends from an outer surface 60 of the finished rotor assembly 16 to the through hole 56. As the oil feed hole 58 extends through the area of the adhesive interface, the previously mentioned seal formed across the interface by the adhesive 50 is important to ensure that any oil does not leak at the interface between the finished adaptor 52 and the finished rotor 54. Any leakage of oil along at the interface would be detrimental to the performance of the finished rotor assembly 16.

Surface 42 includes rib structure 70 which projects above the surrounding parts of surface 42 and includes spaced legs 72 joined at their inner ends by circumferentially extending base rib 76. Hole 58 is between the legs 72, and the ends of the legs 72 fit between legs 78 and abut against the side of base rib 80 of rib structure 82 that is included as part of each outwardly facing surface 24 and projects from the surrounding parts of surface 24. When assembled, the hole 58 is surrounded by the rib structures 70 and 82, and the legs 72 abutting against the side of base rib 80 encloses the hole 58 on four sides to cut off the leak paths around the ends of the ribs 72. Ideally, the sides of the legs 72 also abut against the sides of the legs 78 to further insure against leakage around the ends of the legs 72.

Adhesive may be applied as a bead on the surface 42 extending along the edge between the surface 42 and the flat surface 30 from one recess 44 to the next recess 44. When the adaptor is inserted into the rotor, the adaptor wipes the bead of adhesive inwardly along the surface 42, including along the axially extending legs 72 to wet the overlapping portions of both surfaces 24 and 42, behind the leading edge of the adhesive being wiped inwardly along the surface 42. When insertion reaches the laterally extending base rib 76, the edge of base rib 76 between legs 72, which runs laterally relative to the direction of adaptor insertion into the rotor, wipes adhesive upon further rotor insertion and inhibits adhesive from sagging onto ledge 40. This helps to help retain the adhesive between the surfaces 24 and 42, especially in the area between the legs 72, and helps to assure an adequate quantity of adhesive bonding the interface surfaces 24 and 42.

The rib structures 70 and 82 project above the adjacent portions of the respective interface surfaces 42 and 24 so as to create a small interference (e.g. 90 microns on the diameter) to a small clearance (e.g., 140 microns on the diameter) between the rib structures and the respective facing surface 24 and 42. The rib structures make leakage of the hole 58 at the interface between the rotor and the adaptor less likely, and serve to radially locate the rotor and adaptor relative to each other. In addition, they preserve a small clearance between the adjacent surfaces 24 and 42, that are spaced apart from one another by the rib structures, in which adhesive can reside. This insures that adhesive is not wiped completely clean off the interface surfaces when the parts are assembled, as could occur if there was no clearance between the interface surfaces. Also, if there is a clearance between the rib structures and the surfaces they face, adhesive will fill in those spaces as well. The rib structures also reduce the insertion forces necessary to assemble the rotor and the adaptor. For example, if there was interference between the interface surfaces themselves, without rib structures, the insertion forces may be several thousand pounds, whereas with rib structures they can be reduced to 150-200 pounds.

Although the embodiment described above describes the joining of the rotor 12 and the blank adaptor 10 to form a finished rotor assembly 16, it is contemplated that this method could be used to form any number of powder metal component assemblies formed from a first powder metal component and a second powder metal component. Further, it is contemplated that the male/female joining portions could be switched on the components (e.g., the rotor could have a portion that extends into the adaptor during joining).

Figure 6:
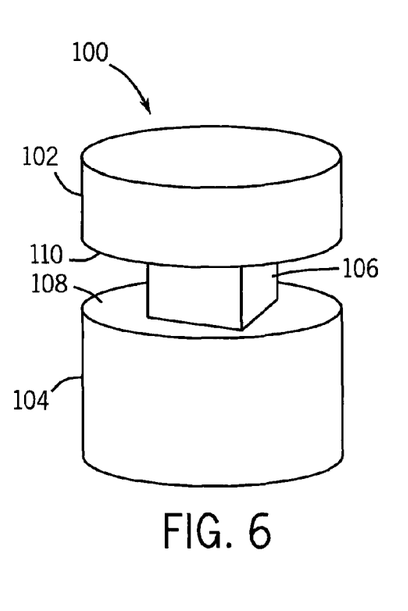
FIG. 6 is a perspective view of a part to which the invention can be applied.

FIG. 6 illustrates an example 100 in which two generally cylindrical parts 102 and 104 are joined by a smaller portion 106 between them. When the surfaces 108 and 110 adjacent to the smaller portion are precision surfaces, or if the spacing between those surfaces must be precise, or if the individual lengths of the parts 102 and 104 must be precise while maintaining the overall length of the entire part, machining presents a challenge. The challenge is exacerbated even further if the smaller portion 106 is non-round.

Figure 7:
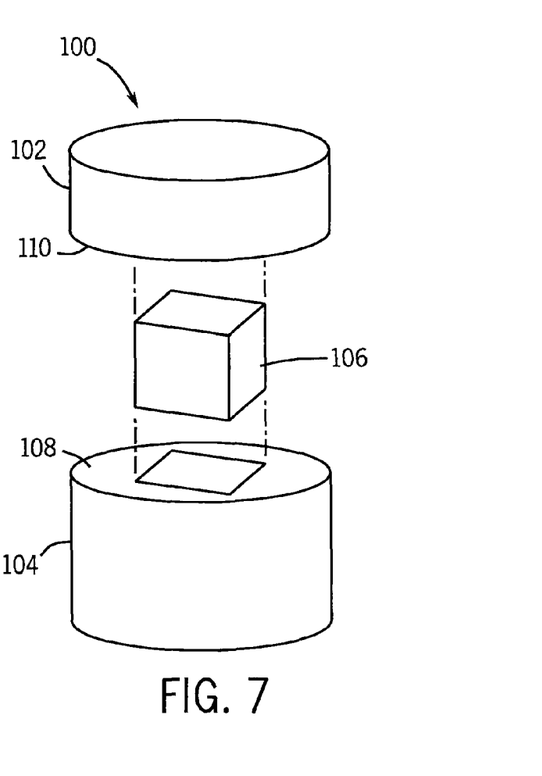
FIG. 7 is a perspective view of the part of FIG. 6 separated into components for application of the invention.

To solve this problem, the invention can be applied and the portions split as shown in FIG. 7. The parts are made of sintered powder metal and the difficult to machine surfaces 108 and 110 are machined precisely prior to assembly, using ordinary machining such as fine grinding or lapping. The parts can then be joined adhesively according to the invention, and any subsequent machining or finishing processes can be performed.

As described above, using the method of adhesive joining components to form a powder metal component assembly offers many distinct benefits over traditional methods of joining multiple powder metal components using high temperature joining methods such as brazing or welding. The powder metal components in the assemblies made from the above-described method will retain their pre joined dimensions much better than those that are made using high temperature joining methods. Thus, assemblies can be formed that have complex geometries, but that also meet strict dimensional requirements that would be time consuming and/or costly to achieve in a part that is integrally formed.

A preferred embodiment of the invention has been described in considerable detail. Many modifications and variations to the preferred embodiment described will be apparent to a person of ordinary skill in the art. Therefore, the invention should not be limited to the embodiment described.

What is claimed is:

1. In a powder metal component assembly for a variable valve timing engine comprising a first powder metal component joined to a second powder metal component by an adhesive, each of the powder metal components having a corresponding interface surface at a joint between the components, the improvement wherein at least one of the powder metal components includes at least one surface adjacent the interface surfaces that is machined prior to the components being joined to one another by the adhesive wherein the first powder metal component is an adaptor and the second powder metal component is a rotor having a ground flat surface wherein both interface surfaces include a rib structure that projects from the corresponding interface surface.

2. The powder metal component assembly of claim 1, in which the powder metal component assembly has an axially-extending finished through hole and wherein the axially-extending finished through hole is formed after the adaptor and the rotor are joined by the adhesive.

3. The powder metal component assembly of claim 1, further comprising at least one radially-extending interlocking feature formed in the first and second components adjacent the interface surfaces.

4. The powder metal component assembly of claim 1, wherein the adhesive is an adhesive that cures without the addition of external heat.

5. The powder metal component assembly of claim 1, wherein the adhesive forms a seal between the powder metal components.

6. The powder metal component assembly of claim 1, wherein the rib structures interfere with one another when the components are assembled.

7. In a powder metal component assembly for a variable valve timing engine comprising a first powder metal component joined to a second powder metal component by an adhesive, each of the powder metal components having a corresponding interface surface at a joint between the components, the improvement wherein at least one of the powder metal components includes at least one surface adjacent the interface surfaces that is machined prior to the components being joined to one another by the adhesive wherein the first powder metal component is an adaptor and the second powder metal component is a rotor having a ground flat surface wherein an oil feed hole extends through the interface surfaces and is at least partially sealed by at least one rib structure that projects from at least one interface surface.

8. In a powder metal component assembly for a variable valve timing engine comprising a first powder metal component joined to a second powder metal component by an adhesive, each of the powder metal components having a corresponding interface surface at a joint between the components, the improvement wherein at least one of the powder metal components includes at least one surface adjacent the interface surfaces that is machined prior to the components being joined to one another by the adhesive wherein the first powder metal component is an adaptor and the second powder metal component is a rotor having a ground flat surface wherein a rib structure is formed on at least one of the interface surfaces that runs laterally to a direction of insertion of one component relative to the other component and the rib structure has a lateral edge that helps maintain adhesive between the interface surfaces.

9. In a powder metal rotor assembly for a variable valve timing engine, the improvement wherein the powder metal rotor assembly comprises a finished rotor and a finished adaptor having a common rotational axis, the finished rotor and the finished adaptor each formed from a powder metal material, the finished rotor having a pair of machined surfaces that are parallel to one another and that are perpendicular to an axis of rotation, the finished rotor and the finished adaptor joined to one another by an adhesive at an interface formed by an interface surface of the finished rotor facing an interface surface of the finished adaptor with the adhesive between the interface surfaces, wherein the interface between the finished rotor and the finished adaptor extends in a direction perpendicular to the pair of machined surfaces of the finished rotor, and further comprising at least one radially-extending interlocking feature formed on each of the finished rotor and the finished adaptor proximate the interface.

10. The powder metal rotor assembly of claim 9, wherein the adhesive wets the interface surfaces and forms a seal between the finished rotor and the finished adaptor, the powder metal rotor assembly further comprising an oil feed hole extending through the seal such that the seal prevents hydraulic fluid leakage in the powder metal rotor assembly.

11. The powder metal rotor assembly of claim 9, wherein at least one interface surface includes a rib structure that projects from the interface surface.

12. In a powder metal rotor assembly for a variable valve timing engine, the improvement wherein the powder metal rotor assembly comprises a finished rotor and a finished adaptor having a common rotational axis, the finished rotor and the finished adaptor each formed from a powder metal material, the finished rotor having a pair of machined surfaces that are parallel to one another and that are perpendicular to an axis of rotation, the finished rotor and the finished adaptor joined to one another by an adhesive at an interface formed by an interface surface of the finished rotor facing an interface surface of the finished adaptor with the adhesive between the interface surfaces wherein both interface surfaces include a rib structure that projects from the corresponding interface surface.

13. The powder metal rotor assembly of claim 12, wherein the rib structures interfere with one another when the finished rotor and the finished adaptor are assembled.

14. In a powder metal rotor assembly for a variable valve timing engine, the improvement wherein the powder metal rotor assembly comprises a finished rotor and a finished adaptor having a common rotational axis, the finished rotor and the finished adaptor each formed from a powder metal material, the finished rotor having a pair of machined surfaces that are parallel to one another and that are perpendicular to an axis of rotation, the finished rotor and the finished adaptor joined to one another by an adhesive at an interface formed by an interface surface of the finished rotor facing an interface surface of the finished adaptor with the adhesive between the interface surfaces wherein an oil feed hole extends through the interface surfaces and is at least partially sealed by at least one rib structure that projects from at least one interface surface.

15. In a powder metal rotor assembly for a variable valve timing engine, the improvement wherein the powder metal rotor assembly comprises a finished rotor and a finished adaptor having a common rotational axis, the finished rotor and the finished adaptor each formed from a powder metal material, the finished rotor having a pair of machined surfaces that are parallel to one another and that are perpendicular to an axis of rotation, the finished rotor and the finished adaptor joined to one another by an adhesive at an interface formed by an interface surface of the finished rotor facing an interface surface of the finished adaptor with the adhesive between the interface surfaces wherein a rib structure is formed on at least one of the interface surfaces that runs laterally to a direction of insertion of one of the interface surfaces relative to the other interface surface and the rib structure has a lateral edge that helps maintain adhesive between the interface surfaces.

16. A method of joining powder metal components comprising:
compacting a first powder metal preform and a second powder metal preform;
sintering the first powder metal preform to form a first powder metal component and the second powder metal preform to form a second powder metal component;
machining at least one surface of at least one of the powder metal components; and
bonding the powder metal components to one another along an interface using an adhesive to form a powder metal component assembly;
wherein the at least one machined surface is located adjacent to the interface containing the adhesive that joins the powder metal components and wherein the first powder metal component is a rotor and the second powder metal component is a blank adaptor, the step of machining at least one surface of one of the powder metal components includes grinding a flat ground surface on the rotor to provide a finished rotor, and the adhesive forms a seal between the finished rotor and the blank adaptor;
the method further comprising, after the step of bonding, turning an inner diameter and an outer diameter of the blank adaptor to provide the finished adaptor adhesively bonded to the finished rotor.

17. The method of claim 16 wherein the finished adaptor and the finished rotor have a common rotational axis.

18. The method of claim 16, wherein the finished adaptor and the finished rotor each have interlocking features formed thereon proximate the interface that improve the strength of the powder metal component assembly under rotational stress.

19. The method of claim 16, wherein the step of bonding the powder metal components to one another occurs without the addition of external heat.

* * * * *